United States Patent [19]

Monin et al.

[11] 3,777,068

[45] Dec. 4, 1973

[54] CURRENT-ANALYZING AND CODING DEVICE USABLE PARTICULARLY IN TELECOMMUNICATIONS FOR NUMBER DIALING BY MEANS OF A KEY SET

[75] Inventors: Claude Monin, Villennes-sur-Seine; Daniel Arpin, Fontenay-aux-Roses, both of France

[73] Assignee: Compagnie Industrielle des Telecommunications Cit-Alcatel, Paris, France

[22] Filed: July 30, 1971

[21] Appl. No.: 167,574

[30] Foreign Application Priority Data

July 30, 1970 France .............................. 7028235

[52] U.S. Cl......... 179/84.55, 179/16 A, 179/16 AA, 179/16 F

[51] Int. Cl. ............................................ H04m 1/26

[58] Field of Search....................... 179/84 SS, 16 A, 179/16 AA, 16 F

[56] References Cited

UNITED STATES PATENTS

| | | | |
|---|---|---|---|
| 3,456,083 | 7/1969 | van der Veen | 179/16 F |
| 2,008,563 | 7/1935 | Sarbey | 179/16 AA |
| 3,476,881 | 11/1969 | Van Hensbergen | 179/84 SS |
| 1,761,115 | 6/1930 | Gardner | 179/16 A |

FOREIGN PATENTS OR APPLICATIONS

| | | | |
|---|---|---|---|
| 1,462,275 | 9/1965 | France | 179/84 SS |

*Primary Examiner*—Ralph D. Blakeslee
*Attorney*—Craig, Antonelli & Hill

[57] ABSTRACT

A current analyzer-coder for a number-dialing system by keyboard control with impedance variation, wherein the state of a plurality of current analyzing relays which operate only in prescribed current ranges indicates the impedance of the line, and means is provided to assure that only a single analyzing relay is engaged for each resistance value, the combination further including means for transferring the information being received to a register or recorder and consisting of a gate controlling a thyristor, and a control device authorizing the transfer only at a specific instant.

9 Claims, 5 Drawing Figures

FIG. 3

INVENTORS:
CLAUDE MONIN AND
DANIEL ARPIN

BY Craig, Antonelli & Hill
ATTORNEYS

INVENTORS:
CLAUDE MONIN AND
DANIEL ARPIN

BY Craig, Antonelli & Hill
ATTORNEYS

CURRENT-ANALYZING AND CODING DEVICE USABLE PARTICULARLY IN TELECOMMUNICATIONS FOR NUMBER DIALING BY MEANS OF A KEY SET

The present invention relates to a current-analyzing and coding device designed especially for number dialing systems wherein number designations are selected with a key set producing an impedance variation in the line, used particularly in telecommunications and telephony systems.

More precisely, the device according to the present invention allows for two successive measurements of the line current to determine the number corresponding to a depressed key, this key inserting into the line two resistors, one of these resistors being traversed by a line current in one specific direction, the other resistor being traversed by current in the opposite direction after the inversion of the current.

As described in applicants' French Pat. No. 1,462,275 and French Patent of addition No. 89,316, keyboard devices have been developed whose principle of operation is the same as described above; however, on the one hand, it is necessary in such systems to take into account the length of the lines in order to determine the resistors to be inserted in the line and the compensating means in the known system which takes this into account is different from that used in the present invention; on the other hand, the means in the known system for analyzing the line currents are themselves different from that of the present invention.

Applicants have a French Patent No. 2,082,216, which relates to impedance compensating means which takes into account the length of the lines. It is the object of the present invention to provide for a new current analyzer which is adapted to the impedance compensating device to which the above-referenced French Patent No. 2,082,216 is directed.

According to one characteristic of the system described in the referenced application, when a subscriber is connected to the line after lifting his handset, the total apparent resistance of the line comprises, first of all, the real resistance of the line (which is the sum total of the resistances of the handset, the station, and the line), increased by the maximum value of the compensating resistances in series with two fixed resistors having a relatively great value. Thus, the maximum value of the compensating resistors is decreased by switching of the contacts of three relays with respective ratios of 1, 2, and 4, until the value of the line current corresponds to that which is normally admissible in the receiver.

The operation of the device proposed in French Pat. No. 1,462,275 and of the French Patent of addition No. 89,316 operates so that when the subscriber lifts his handset, he is connected through his line and the respective stages of the line switching network to a register which returns to him the dial tone and supplies his line with direct current. The subscriber next composes the number of the desired station by successively pressing upon the corresponding keys of his number-selecting push-button keyboard. When he presses upon a key, the subscriber substitutes for the impedance of the handset a unit of two resistors R and R'. Placed in series with each of these resistors is a diode mounted in a direction such that the currents which are able to flow through the two resistors will have opposite directions.

The values of each resistor R and R' are greater at all times than the value of the resistance of the handset in a manner such that the operation of a key always results in a decrease of the line current. This current reduction is detected by a register which carries out first a measurement of the resistor R by supplying a current to the wires a and b in a specific direction. After recording the result of this measurement, the receiver inverts the polarities of the wires *a* and *b* and carries out a measurement of the resistor R'.

As soon as the result of this second measurement is recorded, the polarities of the wires a and b are returned to the initial state thereof and the recording members are immobilized as long as the user does not release the key of his keyboard, i.e., as long as the line current does not reassume a greater value. The signalling system is thus determined by the different values which may be assigned or allotted to the pair of resistors R and R'.

In order to obtain the 10 numbers or digits from 0 to 9, it is necessary to have available 10 combinations of resistors which may be realized or obtained with four different resistors R and four different resistors R' which are distinct therefrom but whose values are equal to those of the resistors R. The code which is utilized will then be as follows:

| | | | |
|---|---|---|---|
| number 1 | R1, R3 | number 6 | R2, R2 |
| number 2 | R1, R4 | number 7 | R3, R3 |
| number 3 | R1, R2 | number 8 | R3, R4 |
| number 4 | R2, R3 | number 9 | R1, R1 |
| number 5 | R2, R4 | number 0 | R4, R4 |

According to the present invention, the four keyboard resistors are preferably arranged in geometric progression in such a manner that the corresponding currents obtained in the line are distributed in four current zones or sections which are quite distinct from each other, each current zone or section corresponding to the engagement of a single analyzing relay. For example, if the lowest resistance is 1 500Ω, one will have:

R1 = 1 500Ω to which corresponds a current zone of 11.6 – 14.8 mA;

R2 = 3 000Ω to which corresponds a current zone of 8.3 – 9.7 mA;

R3 = 6 000Ω to which corresponds a current zone of 5.3 – 5.8 mA;

R4 = 12 000Ω to which corresponds a current zone of 3.07 – 3.25 mA.

The zones or sections take into account the length of the lines and of the compensating resistances, but not of the parallel losses. If the latter are to be taken into account as well, the values of the zone currents $i_1$ and $i_2$ are slightly increased.

The present invention is concerned with a current-analyzing and coding device especially for a number dialing system wherein selective line current values are generated with the aid of a key set by means of impedance variation, particularly in telecommunications systems, which provides by means of two successive measurements of the current in the line a determination of the number or digit corresponding to a specific key which is depressed. More specifically, the invention is characterized in that it comprises a plurality of current-analyzing relays, each operating in a specific current zone, means for assuring that a single analyzing relay operates for each current zone, means for transferring the information being received, and a device producing coincidence pulses for the control of the transfer at a specific instant.

According to one embodiment of the present invention, the analyzing device consists essentially of four analyzing relays, particularly of the magnetostatic type, each of these relays operating in an individual current zone which is assigned thereto, means provided to assure that a single analyzing relay operates for each current zone, transfer means allowing for communicating the state of these relays to the recorder, and a control device which is actuated in order to control the transfer at a specific instant.

As provided in the French Pat. No. 2,092,980 of applicants, the measurement of the line current proper to the first inserted resistor takes place between the instant of touching the key on the key set and the instant of the engagement of the inverter relay I which reverses the line current, this relay I remaining engaged only for a specific period of time, one of the contacts thereof causing a relay I' to operate which itself cuts off the relay I. It is during the time when the relay I is engaged that the measurement of the line current relating to the second resistor takes place, the line current then being reversed.

One characteristic of the present invention resides in the means which are employed to assure that only a single analyzing relay is engaged for a specific measurement. This is accomplished by providing that the positive polarization winding of an analyzing relay allotted to any desired measuring resistor is always susceptible to being short-circuited by the power output of an analyzing relay allotted to a higher order measuring resistor in the case of a simultaneous engagement of two or more relays.

Another characteristic of the present invention resides in the device for transferring the information to the recorder. In accordance with the invention, the output of each analyzing relay is connected to a gate controlling the engagement of a thyristor at the instant at which the measurement of the line current is made, first in the forward direction and then when the current is reversed.

A further characteristic of the present invention consists of the provision of a magnetostatic relay in association with the fifth wire which cannot engage except in the single case where the measuring resistors connected to the line prior to and after the reversal of the current are equal.

These and other characteristics of the present invention will become more obvious from the following description, when taken in connection with the accompanying drawings which show, by way of example only and without being limitative in any way, one embodiment in accordance with the present invention, and wherein FIG. 1 illustrates a partial schematic diagram of the analyzer proposed by the present invention;

Figure 1:
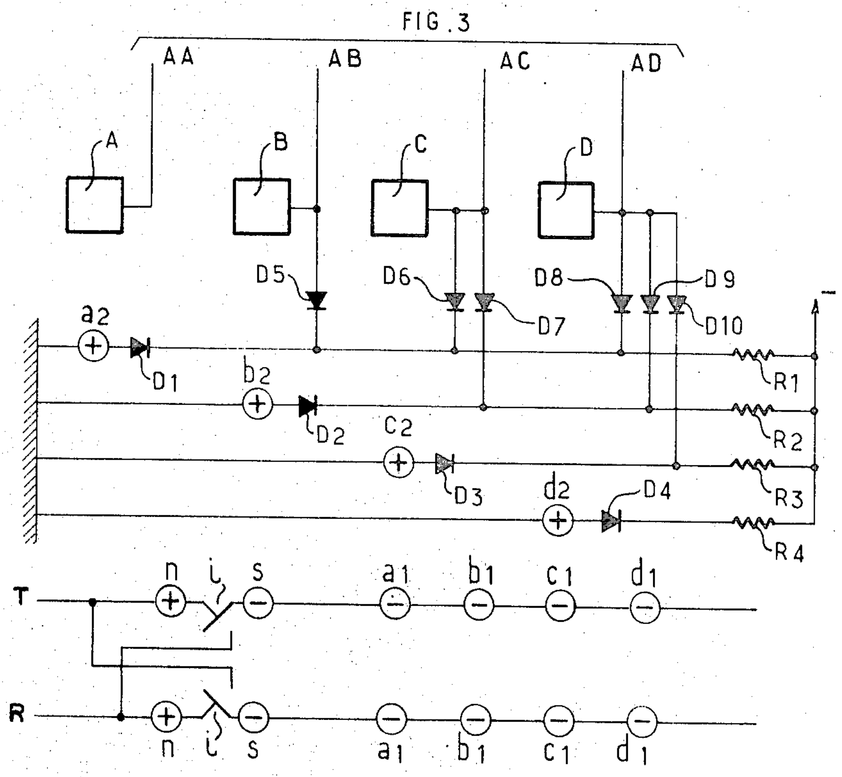

As shown in FIG. 1, mounted in series on each of the line or conductor wires T and R are the control windings, $a_1$, $b_1$, $c_1$ and $d_1$ of four corresponding magnetostatic relays A, B, C, and D. The windings $n$ and $s$ of the magnetostatic relays N and S designed for number dialing and for inspection or supervision, respectively, are not directly a part of the present invention.

Figure 5:
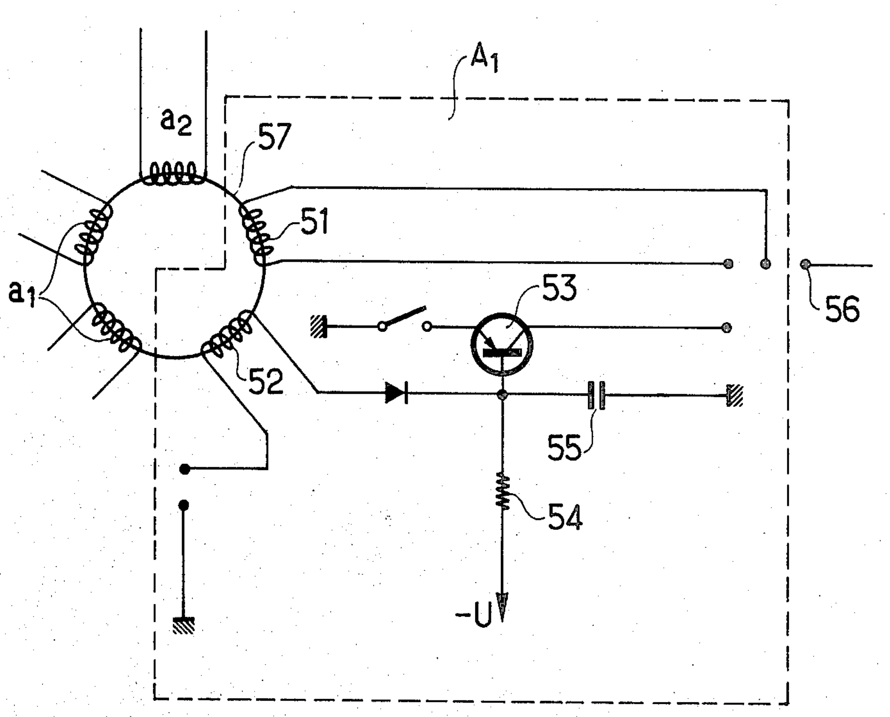
FIG. 5 is a schematic circuit diagram of a magnetostatic relay shown in FIG. 1.

Magnetostatic relays are known from applicants' own U. S. Pats. Nos. 2,949,896 and 3,449,590. FIG. 5 shows a typical relay as disclosed in U.S. Pat. No. 3,449,590, including a magnetic core 57 around which are disposed windings $a_1$, $a_2$, 51 and 52. The windings $a_1$ and $a_2$ serve as the polarization and control windings, respectively, as provided in the circuit of FIG. 1. The relay further includes a transistor 53 having its base connected through resistor 54 to negative voltage U and through a capacitor 55 to ground. The output of the relay is referenced 56. For the detailed operation of this relay, reference is made to U.S. Pat. No. 3,449,590. In general, however, when these relays are engaged, they furnish a constant direct current; when they are in the state of rest, they furnish no output at all. They pass from the state of rest to the operating state when the algebraic sum of the controlling ampere turns thereof is greater than a specific threshold value. In the present case, each magnetostatic relay A, B, C, or D possesses, respectively, one polarization winding $a_2$, $b_2$, $c_2$, or $d_2$ providing positive ampere turns, whereas the windings $a_1$, $b_1$, $c_1$, and $d_1$ which are placed in series on the line furnish negative ampere turns. Before number dialing, the four relays are blocked and the current in the line is fairly substantial. When a resistor is inserted on the line, the current decreases and the polarizing ampere turns can become significant.

The relays A, B, C, and D are called analyzing relays. The polarization winding $a_2$ of the relay A is connected with the input thereof to the positive polarity and with the output thereof to the negative polarity by means of the diode $D_1$ and the resistor R1. Each of the relays other than A is connected with the output thereof, by means of a diode ($D_5$ for the relay B, $D_6$ for the relay C, $D_8$ for the relay D) to the common point between the cathode of $D_1$ and one end of the resistor R1. Likewise, the polarizing winding $b_2$ of the relay B is connected with the input thereof to the positive polarity, and with the output thereof to the negative polarity through the diode $D_2$ and the resistor R2. Each of the relays other than A and B is connected with the output thereof, and by means of a diode ($D_7$ for the relay C and $D_9$ for the relay D) to the common point between the cathode of $D_2$ and one end of the resistor R2. Likewise, the polarizing winding $c_2$ of the relay C is connected with the input thereof to the positive polarity and with the output thereof to the negative polarity through the diode $D_3$ and the resistor R3. Each of the relays other than A, B, and C is connected with the output thereof, and through a diode ($D_{10}$ for the single relay D) to the common point between the cathode of diode $D_3$ and one end of the resistor R3. Finally, the winding $d_2$ is connected with the input thereof to the positive polarity and with the output thereof to the negative polarity by means of the diode $D_4$ and the resistor R4. It will be noted that the contacts i connected in each of the wires T and R allow for reversing the energizing polarities of the line. The subscriber station may thus receive a current with + on T and − on R, or after inversion by means of the relay I, a current with − on T and + on R.

Figure 2:
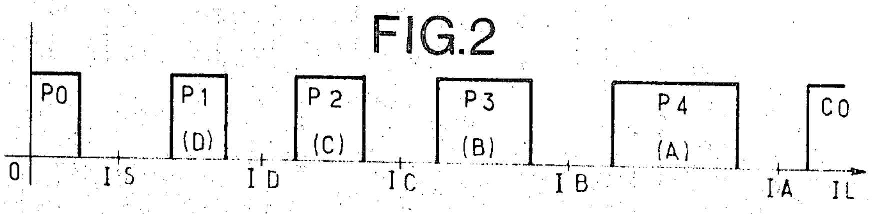
FIG. 2 is a diagram of the current zones or sections obtained by inserting the resistors in the line.

The analyzer relays A, B, C, and D are engaged respectively on the currents comprised in the zones $P_4$, $P_3$, $P_2$, and $P_1$ (FIG. 2). Each of the current zones from $P_1$ to $P_4$ is obtained when one replaces the resistor of the handset by a key set resistor, the key set resistors being, if possible, in geometric progression (for example $x - 2x - 4x - 8x$) in a manner such as to form or constitute current zones being quite distinct with respect to each other, taking into account the parallel losses, the different line lengths, the compensating resistors, and the possible variations of the resistances of the handset.

Thus, for example, the current analyzer relay A will operate for a value of the current in line IA comprised between the zone $P_4$ and the zone of the compensating currents CO. Likewise, the current analyzer relay B will operate for a value of the current in line IB comprised between the zone $P_3$ and the zone $P_4$, and so forth.

On the other hand, since the windings in the line of the different relays A, B, C, and D are identical, means are provided to differentiate the engaging conditions. More particularly, the values of the resistors R1, R2, R3, R4 in series with the polarizing windings $a_2$, $b_2$, $c_2$, $d_2$ have been calculated in a manner such that the engagement thresholds of the relays are separated as has been indicated above in connection with FIG. 2. Furthermore, it should be noted in FIG. 1 that the power output of the relay B or of the relay C or of the relay D short-circuits the polarizing winding $a_2$ of the relay A; the power output of the relay C or of the relay D short-circuits the polarizing winding $b_2$ of the relay B; and, the power output of the relay D short-circuits the polarizing winding $c_2$ of the relay C, so that only a single analyzer relay is allowed to engage at one time.

If the line current is such that it allows for two or more relays to become engaged, for example, relays A and B, only the relay of the lowest order (here the relay B) is maintained operative because the relay B blocks the relay A by short-circuiting its winding $a_2$, and thus this relay alone remains engaged.

Figure 3:
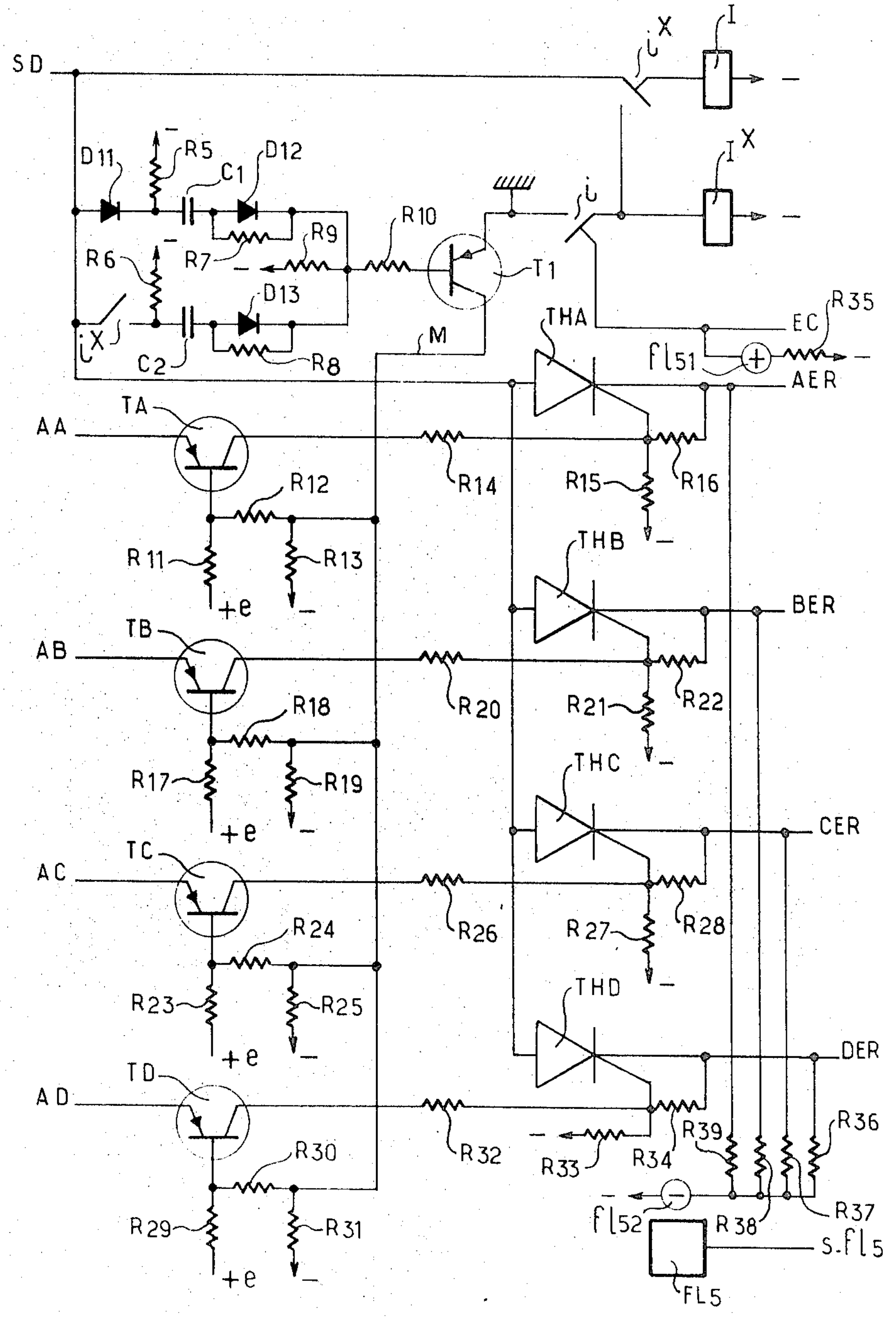
FIG. 3 is a schematic circuit diagram of a control circuit utilized with the analyzer shown in FIG. 1.

In FIG. 3, the wire SD provides a positive polarity signal during the period of effective number dialing, which is to say, during the time when the key of the key set is pressed down. This polarity causes on the one hand the energization of the relay I through the rest contact $i^x$ to produce reversal of the line current and, on the other hand, the application of this positive polarity signal to the anodes of the thyristors THA, THB, THC, and THD.

The wires AA, AB, AC, and AD originate from the respective outputs of the analyzer relays A, B, C, and D of FIG. 1. The wire AA is connected to the emitter of the transistor TA, the wire AB to the emitter of the transistor TB, and so forth. The wires AER, BER, CER, and DER are used for the transfer of the code to the recorder. The collector of the transistor TA is connected, by means of the resistor R14, to the gate of the thyristor THA, the latter also being connected to the negative polarity by means of the resistor R15 and to the cathode of the thyristor THA by means of the resistor R16. The cathode of THA is also connected to the output AER. The base of the transistor TA is connected, on the one hand, by means of the resistor R11, to a positive potential + $e$ with respect to ground and, on the other hand, by means of the resistor R12 to the collector of a transistor $T_1$; the common point between the end of resistor R12 and the collector of $T_1$ is connected to negative polarity by means of resistor R13. Analogous connections of the collector and of the base exist for each of the other transistors TB, TC, and TD.

The emitter of the transistor $T_1$ is connected on the one hand to positive polarity and on the other hand to the working contact $i$ of a branching circuit which is connected, on the one hand, to the working contact $i^x$ and on the other hand to the input of the relay $I^x$, the rest contact $i$ being connected to the output EC (emission of numbers) and to the input of a winding f151 whose output is connected to negative polarity by way of the resistor R35. The base of the transistor $T_1$ is connected by way of the resistor R10 to a common point with five circuit branches. The first branch consists of the diode $D_{12}$ connected in series with the capacitor $C_1$ and a diode $D_{11}$, the two diodes $D_{11}$ and $D_{12}$ being oriented in the same direction, the anode of $D_{11}$ being connected to the wire SD and a resistor R5 being connected in shunt at the common point between the cathode of diode $D_{11}$ and one side of capacitor $C_1$, the end of R5 being connected to the negative polarity. The second circuit branch consists of the resistor R7 whose end is connected to the common point between the other side of capacitor $C_1$ and the anode of $D_2$. The third circuit branch consists of the resistor R9 which is connected to negative polarity. The fourth circuit branch consists of the diode D13 connected in series with a capacitor $C_2$ and the working contact $i^x$ whose segment is connected to the line SD, the common point between the working contact $i^x$ and the armature of the capacitor $C_2$ being connected to a resistor R6 whose end is connected to negative polarity. The fifth circuit branch consists of the resistor R8 whose end is connected to the common point between the other side of the capacitor $C_2$ and the anode of the diode $D_{13}$.

The magnetostatic relay FL5 comprises an output wire S-f15 and two control windings f151 and f152. The winding f151 furnishes positive ampere turns and is energized in shunt on the wire EC for number emission; the winding f152 furnishes negative ampere turns, the input of this winding being common to four circuits in parallel. The first of these is connected by way of the resistor R39 to the cathode of THA. The second one is connected by way of the resistor R38 to the cathode of THB. The third one is connected by way of the resistor R37 to the cathode of THC. The fourth one is connected by way of the resistor R36 to the cathode of THD.

Figure 4:
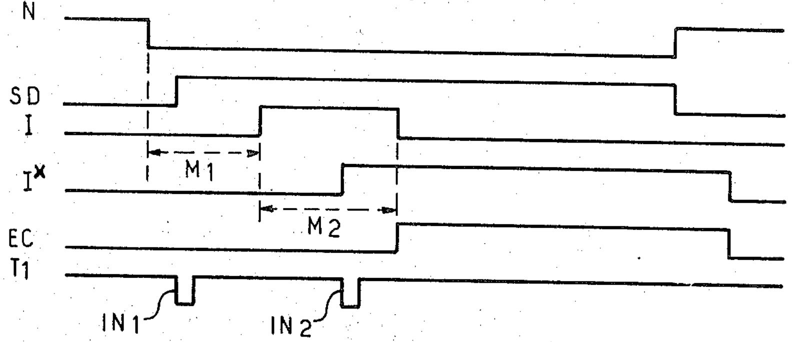
FIG. 4 is an operating diagram of the device proposed by the present invention.

FIG. 4 is a general waveform diagram pertinent to the operation of the invention. When one button of the key set is pressed down, the magnetostatic relay N (not shown) for number-dialing, whose two control windings n have been illustrated in FIG. 1, is released and maintained released as long as the key is depressed. The release of relay N causes the appearance of a positive polarity on the wire SD (FIG. 3) and therewith the operation of the inversion relay I, whose two branching contacts i are shown in FIG. 1. The first measurement $M_1$ of the current in the line is made between the instant of the release of the number-dialing relay N (the instant in which the first key set resistor is inserted into the line), and the instant when the relay I is engaged; the second measurement $M_2$ of the line current is made during the time when the relay I remains engaged, during which time the current in the line is inverted and can flow through the second resistor inserted into the line. The relay $I^x$ cuts off the relay I which is deenergized with the normal delay of an electromagnetic relay. Since the relay $I^x$ is engaged and the relay I remains deenergized, the polarity placed on SD is transmitted on the wire EC in order to inform the recorder that a number emission is taking place. The wire M which is in fact the output wire (collector) of the transistor $T_1$ is the seat of two impulses $IN_1$ and $IN_2$ corresponding respectively to the instants when the polarity is placed on SD and to the engagement of the relay $I^x$; these are the recording instants.

The operation of the device shown in FIGS. 1 and 3 will now be given hereinafter by way of example. It is assumed that the key 5 of the key set is depressed, which means that successively the resistors R2 and R4 are placed in line (R2 being equal, for example, to 3,000 ohms and R4 to 12,000 ohms).

The connection to the line of R2 corresponds to the engagement of the relay B, which means the appearance of a positive polarity on the wire AB and on the wire SD. The transistor $T_1$ which is normally conducting (its emitter being at a higher potential than the base thereof) is blocked for one instant by the appearance of the positive polarity on the wire SD, and the capacitor $C_1$ being charged causes the potential of the base to vary. A negative potential is thus placed, during this instant, on the base of the transistors TA to TD, for example for TB by the circuit $+ e$, resistor R17, resistor R18, resistor R19, and negative polarity. If at the same instant a positive polarity arrives by way of the wire AB, the transistor TB becomes conducting and places through the resistor R20 a positive polarity on the gate of the thyristor THB. Since the anode of all of the thyristors is energized moreover by the wire SD, the thryistor THB is engaged and stays in that condition as long as the same polarity subsists on SD.

After engagement of the relay I, the reversal of the line current takes place and the resistor R4 is in turn traversed by the line current. To the resistor R4 corresponds the engagement of the analyzer relay D. The relay I by being engaged causes the engagement of the relay $I^x$, and the positive polarity of line SD interrupts again momentarily the conductivity of the transistor $T_1$ during the charge of capacitor $C_2$. As described previously for the transistor TB, the coincidence between the momentary blocking of the transistor $T_1$ and the appearance of a positive polarity on the wire AD produces the conduction of the transistor TD, and as a result the engagement of the thyristor THD is accomplished at that time due to the simultaneous application of the proper potential to the gate and the anode thereof.

The wires BER and DER thus marked positively transmit to the recorder the indication of the actuation of the analyzer relays B and D corresponding to the key 5 of the key set. When the caller removes his finger, the number dialing relay N is reconnected and suppresses the polarity on line SD. The thyristors THB and THD are thus released.

When it is a question of a number, for example the number 9, which applies to the line in series successively the same resistor R1, the operation is as follows. Prior to the reversal of the current, the magnetostatic relay A which corresponds to the resistor R1 becomes engaged and causes the engagement of the thyristor THA in a manner analogous to that described above for resistor R2. After the reversal of the current in the line, it is still the magnetostatic relay A which is engaged since the second resistor present is also equal to R1. The thyristor THA which was engaged is maintained in that condition by keeping in memory its first engagement. It is evident that no other thyristor is excited at this time.

Thus, in the case of the numbers 6 (R2, R2), 7 (R3, R3), 9, (R1, R1), and 0 (R4, R4) which successively put into operation the same resistor, a single thyristor is engaged, whereas two thyristors are engaged in all other cases.

The magnetostatic relay FL5 establishes precisely this difference in the coding to be transmitted to the recorder. The relay FL5 comprises two control windings. One of these windings f151 provides the positive ampere turns, the other winding f152 furnishing the negative ampere turns. The winding f151 has the same number of positive ampere turns at all times since it is taken in shunt on a circuit which is always the same (wire EC for emission of numbers). The winding f152 is susceptible to provide different numbers of ampere turns depending upon whether a single thyristor or two thyristors are released. In the first case, a single engaged thyristor corresponds to a circuit wherein a single resistor (R39 for example) is disposed in series with the winding f152; in the second case, two resistors (R38 and R36 for example) disposed in parallel give an equivalent resistance reduced by half in series with the winding f152; thus, the latter has twice the number of ampere turns and consequently the negative ampere turns will become equal to the positive ampere turns. The relay FL5 does not engage under these circumstances. In contrast thereto, the relay FL5 is engaged in the first case (a single engaged thyristor) since the positive ampere turns are predominant. A positive polarity thus appears on the line S–f15 every time a single thyristor is excited or acted upon, which represents the numbers 6, 7, 9, and 0.

Coding in code 2 among 5 will thus be made according to the table given below:

| | |
|---|---|
| number 1 (R1, R3) | wires AER and CER |
| number 2 (R1, R4) | wires AER and DER |
| number 3 (R1, R2) | wires AER and BER |
| number 4 (R2, R3) | wires BER and CER |
| number 5 (R2, R4) | wires BER and DER |
| number 6 (R2, R2) | wires BER and S-f15 |
| number 7 (R3, R3) | wires CER and S-f15 |
| number 8 (R3, R4) | wires CER and DER |
| number 9 (R1, R1) | wires AER and S-f15 |
| number 0 (R4, R4) | wires DER and S-f15 |

It is understood that the present invention is by no means limited to the embodiment described and shown herein which has been given merely by way of example. More particularly, it would be possible to modify certain portions or replace certain elements by equivalent means without departing from the spirit and scope of the present invention.

What we claim is:

1. In combination with a number dialing system providing for the selective connection to a line of two resistors whose values designate a number to be dialed each time a key on a keyboard is depressed, the two resistors each being connected in series with means for permitting current flow through the resistors only in opposite directions, and register means responsive to a key being depressed for applying an analyzing current to said line, a current analyzing and coding device comprising a plurality of analyzing relays each providing an output and having windings connected in series with said line and being capable of operating only in respective separate and distinct current zones of sequential order, regulation means connected to said analyzing relays for preventing more than a single relay from operating for each current zone, including an individual regulation resistor connected in series with a second bipolar winding of each analyzing relay, respectively, across a voltage source, and a diode connected between the output of each analyzing relay and the regulation resistors of all relays having higher order current zones, measuring means for effecting two successive measurements of the line current by controlling the direction of the current in the line, transfer means for transferring signals indicating the operating state of the analyzing relays to said register, and control means producing coincidence impulses for controlling the operation of said transfer means at a specific instant.

2. The combination defined in claim 1 wherein said transfer means includes a gate connected to the output of each analyzing relay, and a thyristor provided for each analyzing relay, the respective gates of said analyzing relays being connected to the control electrodes of the corresponding thyristors.

3. The combination defined in claim 2 wherein four regulation resistors are provided having values which differ in geometric progression in the ratio 2.

4. The combination defined in claim 3 wherein four analyzing relays are associated with the four regulation resistors and are individually connected to respective thyristors by individual gates, said control means including actuating means responsive to the depression of a key on the keyboard for enabling said gates during a first measuring period.

5. The combination defined in claim 4 wherein said measurement means includes inversion means responsive to depression of a key on the keyboard for reversing the current in said line after a predetermined time to thereby provide first and second measuring periods during which said current flows in opposite directions in the line.

6. The combination defined in claim 5 wherein said actuating means includes means responsive to said measurement means for enabling said gates during said second measuring period.

7. The combination defined in claim 6 wherein said transfer means includes additional relay means responsive to the outputs of said thyristors for providing an output when the two measuring resistors connected to the line are of equal value.

8. The combination defined in claim 1 wherein said transfer means includes a gate connected to the output of each analyzing relay, and a thyristor provided for each analyzing relay, the respective gates of said analyzing relays being connected to the control electrodes of the corresponding thyristors.

9. The combination defined in claim 1 wherein said measurement means includes inversion means responsive to depression of a key on the keyboard for reversing the current in said line after a predetermined time to thereby provide first and second measuring periods during which said current flows in opposite directions in the line.

* * * * *